United States Patent
Sato et al.

(10) Patent No.: US 7,528,878 B2
(45) Date of Patent: May 5, 2009

(54) SOLID STATE IMAGE DEVICE AND CAMERA USING IT

(75) Inventors: Toshiaki Sato, Shizuoka-ken (JP); Kazuhiro Saito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 654 days.

(21) Appl. No.: 11/214,947

(22) Filed: Aug. 31, 2005

(65) Prior Publication Data

US 2006/0044627 A1    Mar. 2, 2006

(30) Foreign Application Priority Data

| Sep. 2, 2004 | (JP) | ............................. 2004-255693 |
| Jun. 30, 2005 | (JP) | ............................. 2005-192013 |

(51) Int. Cl.
H04N 3/14   (2006.01)

(52) U.S. Cl. ...................................... 348/317; 348/294

(58) Field of Classification Search ................. 348/317, 348/316, 319, 324
See application file for complete search history.

(56) References Cited

U.S. PATENT DOCUMENTS

| 4,935,808 | A | * | 6/1990 | Hashimoto ................... 348/283 |
| 5,043,821 | A | | 8/1991 | Suga et al. ............. 358/213.29 |
| 5,430,294 | A | * | 7/1995 | Mears et al. ................. 250/332 |
| 5,430,481 | A | * | 7/1995 | Hynecek ..................... 348/317 |
| 5,475,427 | A | * | 12/1995 | Horowitz ..................... 348/241 |
| 5,583,076 | A | | 12/1996 | Yoshizawa et al. .......... 437/211 |
| 5,861,620 | A | * | 1/1999 | Takahashi et al. ......... 250/208.1 |
| 5,912,504 | A | | 6/1999 | Yoshizawa et al. .......... 257/730 |
| 6,211,914 | B1 | * | 4/2001 | Kubo ......................... 348/241 |
| 6,476,864 | B1 | * | 11/2002 | Borg et al. .................. 348/245 |
| 6,480,227 | B1 | * | 11/2002 | Yoneyama .................. 348/308 |
| 6,549,043 | B2 | * | 4/2003 | Roovers ....................... 327/94 |
| 6,885,396 | B1 | * | 4/2005 | Panicacci et al. ............ 348/241 |
| 2005/0046715 | A1 | * | 3/2005 | Lim et al. ................... 348/294 |

FOREIGN PATENT DOCUMENTS

| EP | 0 926 885 A2 | 6/1999 |
| JP | 11-196332 | 7/1999 |

* cited by examiner

*Primary Examiner*—Tuan V Ho
*Assistant Examiner*—Gary C Vieaux
(74) *Attorney, Agent, or Firm*—Fitzpatrick, Cella, Harper & Scinto

(57) ABSTRACT

A solid state image device with a high frame rate, that can restrain image distortion etc. from taking place in case of filming of moving pictures or rapid filming and moreover can output signals excellent in the S/N proportion in a stable fashion, and a camera using it is provided. A frame memory apparatus having a plurality of memories respectively corresponding with respective pixels of a photoelectric conversion apparatus and an apparatus of recording signals of respective pixels of the photoelectric conversion apparatus into the memory elements of the frame memory apparatus are included. The memory element is configured at least by a sample hold circuit, the sample hold circuit has a capacitor apparatus and an impedance conversion apparatus and the impedance conversion apparatus is configured by an operational amplifier.

2 Claims, 17 Drawing Sheets

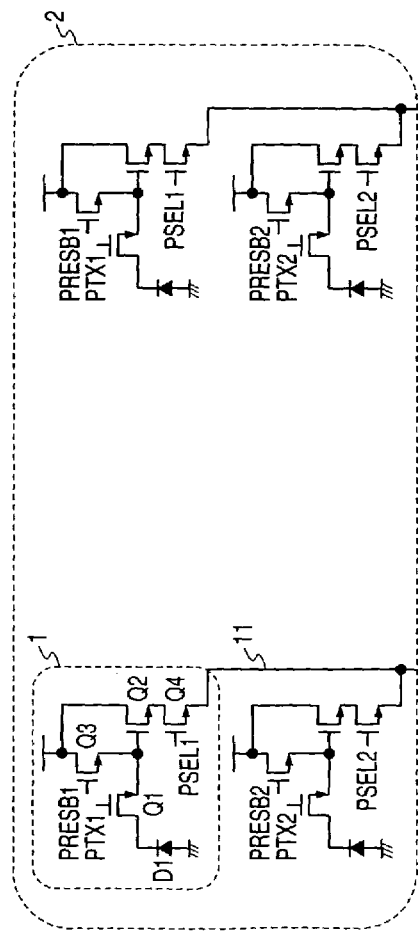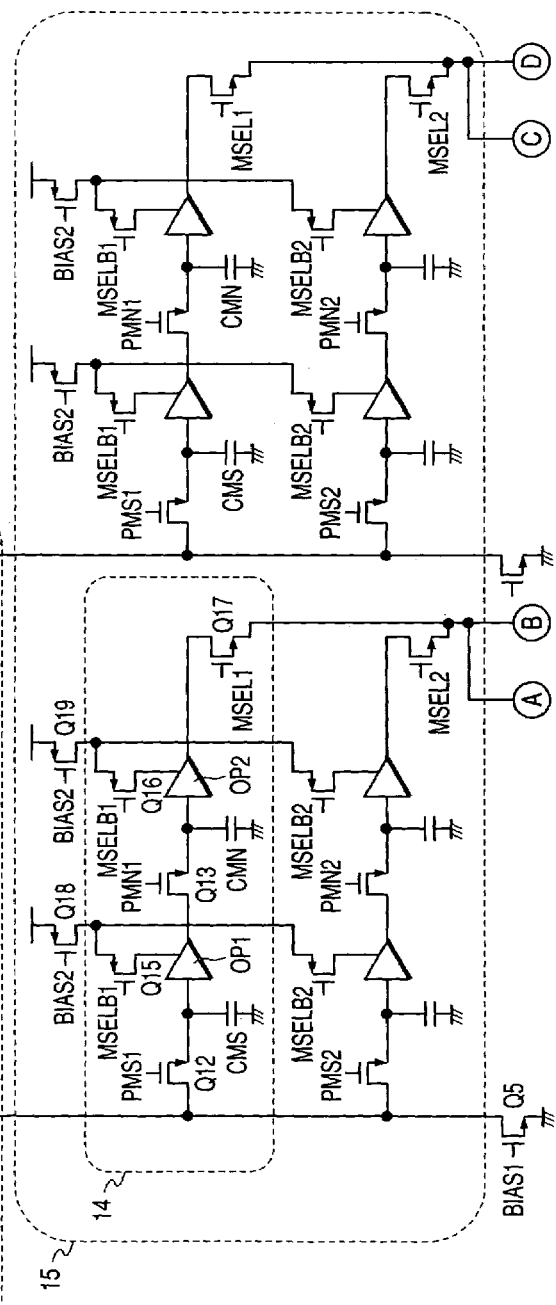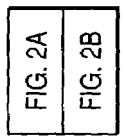
FIG. 2
FIG. 2A

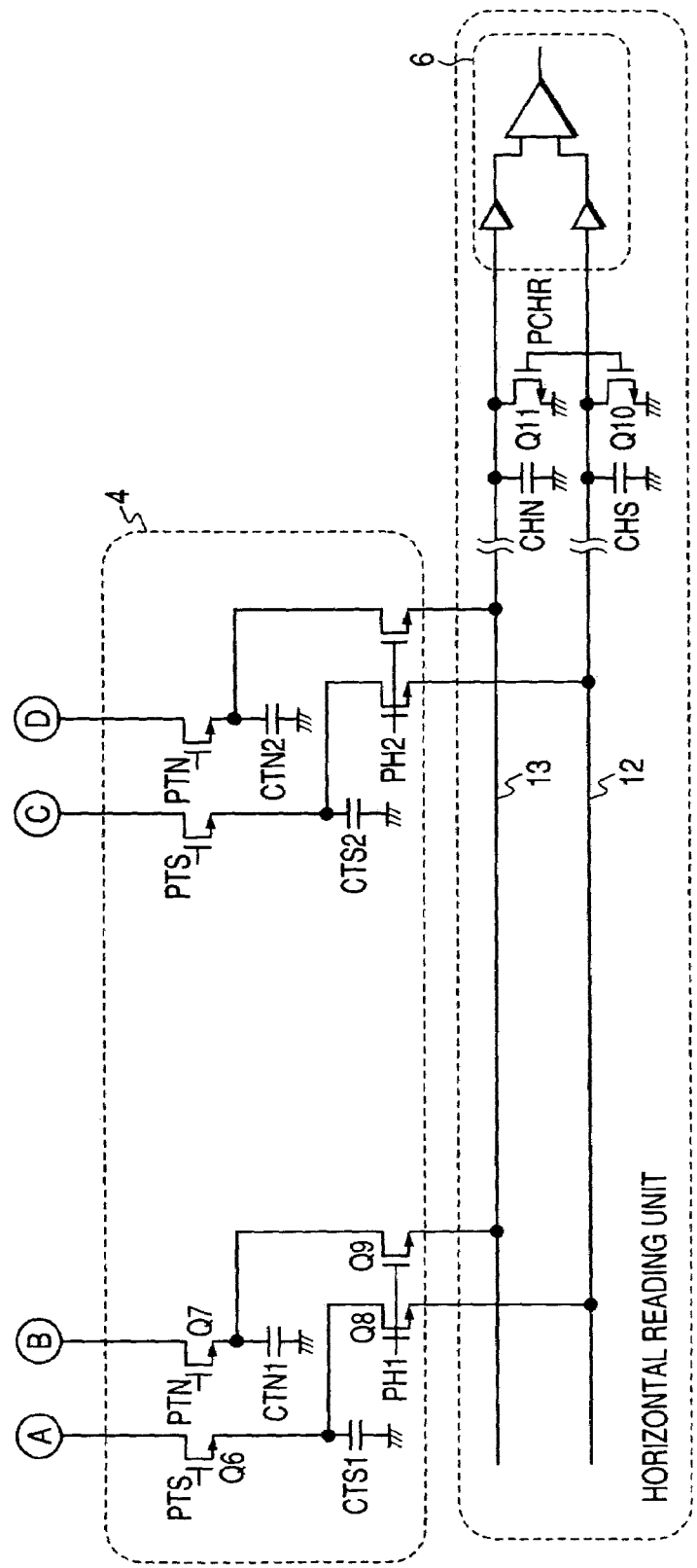

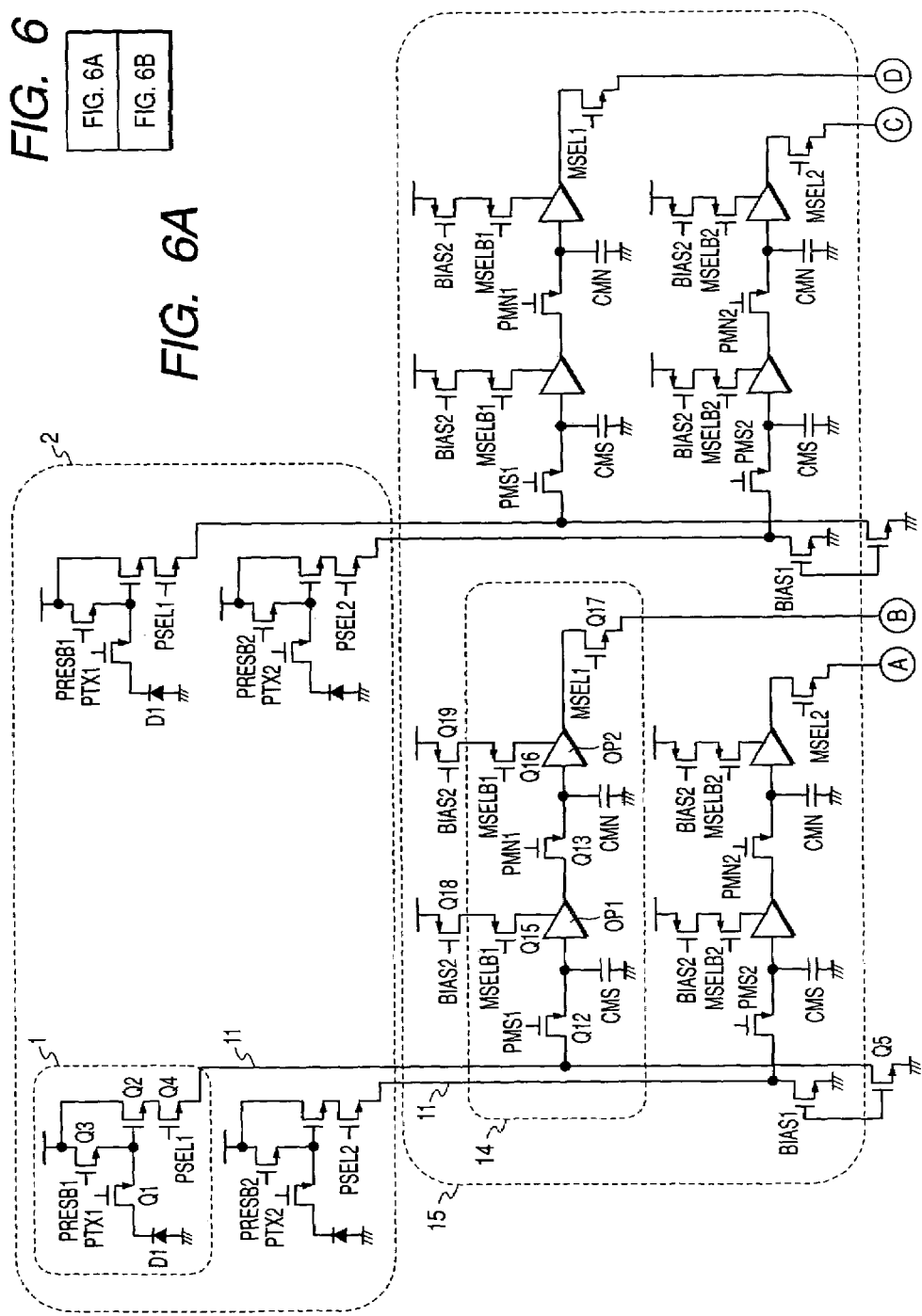

SOLID STATE IMAGE DEVICE AND CAMERA USING IT

BACKGROUND OF THE INVENTION

1. Field of the Invention

The present invention relates to a solid state image device, in particular to a solid state image device suitable to an image system of acquiring a moving picture or images at a high frame rate to synthesize them to form an image and a camera using it.

2. Related Background Art

FIG. 10 is a block diagram showing a prior art solid state image device. This has been disclosed, for example, in Japanese Patent Application Laid-Open No. H11-196332 being a Japanese patent. The solid state image device in FIG. 10 has a pixel 1 which converts an optical signal to an electric signal, a photoelectric converter 2 with a plurality of pixels 1 being arranged two-dimensionally, a vertical shift register 3 (VSR1) which selects the two-dimensionally arranged pixels sequentially on a row-by-row basis in the vertical direction. Moreover, the solid state image device in FIG. 10 has a line memory unit 4 that retains each pixel signal of a selected line and a horizontal shift register 5 (HSR1) that scans signals of each pixel stored in the line memory unit 4 sequentially in the horizontal direction to transfer to a read out circuit 10.

Here, the photoelectric converter 2 shows an example of 6 rows by 8 columns, but the pixel arrangement is not limited thereto and optional. In addition, the read out circuit 10 has an operational amplifier 6 of bringing signals from the line memory unit 4 into impedance conversion and a gain control amplifier (AGC) 8 of adjusting signal gains and subtracting offset levels set by a DA converter 7 from signal levels to adjust offset levels. Moreover the read out circuit 10 is configured by including an AD converter 9 of converting an output of the gain control amplifier 8 to a digital signal.

At the time of acquiring an image with a solid state image device, a method of converting, into electric signals, optical signals derived by pixels having undergone radiation with operation of a shutter during a constant storage period to output is general. As for a shutter, there is means that shields light radiated to an image device with a mechanical shutter as in a camera apparatus, but there is also a case of a solid state image device itself electrically operating shutter operations.

In particular, in the solid state image device with a CMOS (complementary field effect transistor), a general method is a slit rolling shutter operation, that is, a method of scanning a vertical shift register twice during a single image pickup period, a first scan resetting each pixel to commence storage and a second scan completing storage to output signals.

Operations of this solid state image device will be described in detail with reference to FIG. 11 and FIG. 12. FIG. 11 is a circuit diagram showing the photoelectric conversion unit 2 shown in FIG. 10, a line memory unit 4 and an operational amplifier 6, being a part of the read out circuit 10, of bringing signals from the line memory unit 4 into impedance conversion. A pixel 1 is configured by a photodiode D1 of converting an optical signal into a electrical signal, a transfer switch Q1 for transferring an electric charge stored in the photodiode D1 to a gate of a transistor Q2 that configures a source follower, a reset switch Q3 for resetting the gate of the transistor Q2 and a row selection switch Q4.

Here, the pixel arrangement will be described with an example of, but not limited to, 2 rows by 2 columns. Reference character Q5 denotes a constant current circuit to become a load of the vertical output line 11 to which the row selection switch of each pixel is connected. Reference characters CTS1 to 2 and CTN1 to 2 denote capacitors being line memories respectively. Reference characters Q6 and Q7 denote transfer switches for writing pixel outputs of a selected row to the line memories. Reference characters Q8 and Q9 denote transfer switches of reading out signals from the line memories to the horizontal output lines 12 and 13. Reference characters CHS and CHN denote load capacitors of the horizontal output lines 12 and 13. Reference characters Q10 and Q11 denote reset switches for resetting the capacitors CHS and CHN. Here, the vertical shift register 3 and the horizontal shift register 5 are omitted for simplifying the description.

FIG. 12 is a timing chart showing operations of the circuit in FIG. 11. When the vertical shift register 3 operates, for a selected 1st row, a reset pulse PRESB1, a transfer pulse PTX1 and a row selection pulse PSEL1 are outputted. At first, as described above, the first scan of the vertical shift register implements shutter line scanning, but in order to make descriptions readily understandable, the second scan of the vertical shift register, that is, read out line scanning will be described first.

In FIG. 12, read out line scanning starts at the time t14, a row selection pulse PSEL1 will move to a high level while a reset pulse PRES1B will move to a low level. Moreover, a source follower Q2 of the selected row is connected to the vertical output line 11 and a gate thereof will come into a floating state so as to become capable of accepting a signal charge from the photodiode D1.

However, at this time, since the gate of the source follower Q2 gives rise to reset noise Vn to therefore result in an S/N drop, correction is necessary. Under the circumstance, the transfer switch Q7 is turned ON with a transfer pulse PTN at the time t15 so that the reset noise Vn is transferred to the line memories CTN1 to 2. Next, during the period of the time t16 to t17, the transfer switch Q1 is turned ON by the transfer pulse PTX1, then the signal electric charge stored in the photodiode D1 is transferred to the gate of the source follower Q2 and undergoes voltage conversion with the gate capacitance of Q2.

The gate voltage at this time will be a sum Vs+Vn between a component Vs derived by a signal electric charge and a reset noise component Vn. Thereafter, at the time t18, the transfer switch Q6 is turned ON by a transfer pulse PTS so that the signal is transferred to the line memories CTS1 to 2. Next, at the time t19, PTX1 and PRESLB return to high levels, and the gates of the photodiode D1 and the source follower Q2 are short-circuited to a reset potential (here, power supply) by a reset switch Q3 are both reset. Thereafter, at the time t20, the row selection pulse PSEL1 will move to a low level so that the source follower Q2 of each pixel is cut off from the vertical output line 11 so that signal transfer from the pixel of the selected row to the line memory unit 4 is completed.

When operations so far are over, the step moves to a horizontal read out operation from the time t21. The horizontal read out operation transfers signals retained in the respective line memories CTS1 to 2 and CTN1 to 2 to the load capacitors CHS and CHN of the horizontal output lines 12 and 13 respectively. As for horizontal read out, firstly, a horizontal output line reset pulse PCHR moves to a high level to turn ON Q10 to 11 to reset CHS and CHN. Next, the shift pulse PH1 of the horizontal shift register 5 moves to a high level to turn ON the transfer switches Q8 and 9 so that the line memories CTS1 and CTN1 and the horizontal output lines 12 and 13 get electrically conductive.

Thus, the signals retained by the line memories CTS1 and CTN1 undergo capacitance division into CHS and CHN respectively and are inputted to the read out circuit 6. The read out circuit 6 buffers the respective transferred signals and thereafter implements subtraction processing. That is, an output of the read out circuit 6 is derived by $$CTS1 \times (Vs + Vn)/(CTS1 + CHS) - CTN1 \times (Vn)/(CTN1 + CHN) =$$
$$CTS \times (Vs)/(CTS + CHS) \ (\because CTS1 = CTN1),$$

expressing that the above described reset noise Vn is cancelled.

Next, the horizontal output lines 12 and 13 are reset again with PHCR and signals of the next pixel are read out from CTS2 and CTN2 with the horizontal shift pulse PH2. So far, read out for one row selected by a series of vertical operations and horizontal operations is all completed. Thereafter, the vertical shift register scans to select the subsequent row at the time t22 and the above described operations are repeated.

As described above, storage of optical signals at the photoelectric converter 2 is over at the point of time (time t17) when the transfer switch Q1 turns OFF subject to transfer of a signal electrical charge to a gate of the source follower Q2, and therefore the period since the shutter is operated until transfer operation is completed will become storage hours. A slit rolling shutter operation is to implement exactly the same operations as the above described read out operations prior to read out scanning, intended to implement shutter operations electrically inside a solid state image device.

That is, in FIG. 12, a first operation of vertical shift register starts at the time t1. Difference from the above described read out line scanning is that the row selection pulse PSEL1 remains at a low level. The reason thereof is that there is no need to make an access to the line memory since the object of a shutter operation is to rest a pixel.

Thereafter, reset of a pixel and a gate of a source follower Q2 starts at the time t5 and ends at the time t6, and then the photodiode will get to a floating state so as to become capable of storing a photoelectric charge. That is, storage hours will be from the time t6 to the time t17. In addition, in order to equalize storage hours of respective rows, although each pixel and the vertical output line are not electrically conductive, also at the time of shutter operations, a line memory writing period and a dummy reading period equivalent to substantial reading for a horizontal read out operation are necessary. Pulses during these shutter periods are indicated by broken lines in FIG. 12, but these pulses are not always required to be outputted.

In the configuration of a prior art solid state image device as described above, in order to read out the output of each row as shown in FIG. 13 thoroughly, a series of operation period is required as follows:

shutter→transfer 1 (pixel→line memory)→dummy reading (line memory→horizontal output)→storage→transfer 1 (pixel→line memory)→substantial reading (line memory→horizontal output).

Accordingly, a period T1 to read out an output for 1 frame will take long and a number of frames required for a case of filming a moving picture etc. will not be derived. In addition, since the storage starting time of each row is different, an image will skew as shown in FIG. 14 to deteriorate an image quality. Or in such a system that the pictured images were patched together to form a piece of image later, there was a disadvantage that seams between images were misaligned at last, etc.

SUMMARY OF THE INVENTION

The present invention is derived in view of the above described problems, and an object thereof is to provide a solid state image device with a high frame rate, that can restrain image distortion etc. from taking place in case of filming of moving pictures or rapid filming and moreover can output signals excellent in the S/N proportion, and to provide a camera using it.

In order to attain the above described object, a solid state image device of the present invention with photoelectric conversion means having a plurality of pixels two-dimensionally arranged and read out means of sequentially reading out outputs of the above described photoelectric conversion means comprises frame memory means having a plurality of memory elements and means of recording a signal of each pixel of the above described photoelectric conversion means into the memory elements of the above described frame memory means, wherein the above described memory element is configured at least by a sample hold circuit, the above described sample hold circuit has capacitor means and impedance conversion means and the above described impedance conversion means is configured by voltage amplifying means.

In order to attain the above described object, a solid state image device of the present invention with photoelectric conversion means having a plurality of pixels two-dimensionally arranged and read out means of sequentially reading out outputs of the above described photoelectric conversion means comprises frame memory means having a plurality of memory elements and means of recording a signal of each pixel of the above described photoelectric conversion means into the above described memory elements of the above described frame memory means, wherein the above described memory element is configured at least by a sample hold circuit, the above described sample hold circuit has capacitor means and impedance conversion means and the above described impedance conversion means is configured by an operational amplifier.

In the present invention, since the frame memory unit consists of memory elements configured by capacitor means and voltage amplifying means or an operational amplifier, signals can be amplified by applying a voltage gain of 1 or more, alleviation of influence of random noise of a subsequent stage read out circuit unit 10 and improvement of S/N proportion will become feasible. In addition, an operational amplifier is excellent in features of supply-voltage rejection ratio and the like compared with other buffer means such as a source follower etc. and therefore a stable circuit can be configured. In the present invention, since the frame memory unit records outputs of all pixels, external read out of image information will become feasible during shutter and storage operations of the photoelectric conversion unit as well. According to the present invention, recording outputs of all pixels onto the frame memory, image output at a high frame rate will become feasible and external read out of image information will become feasible during shutter and storage operations of the photoelectric conversion unit as well.

BRIEF DESCRIPTION OF THE DRAWINGS

FIG. 2 is comprised of FIGS. 2A and 2B showing circuit diagrams of the first embodiment showing a photoelectric conversion unit, a frame memory unit, a line memory unit and an operational amplifier 6 being a part of a read out circuit;

DESCRIPTION OF THE PREFERRED EMBODIMENTS

Next, the best mode for carrying out the invention will be described in detail with reference to drawings.

First Embodiment

Figure 1:
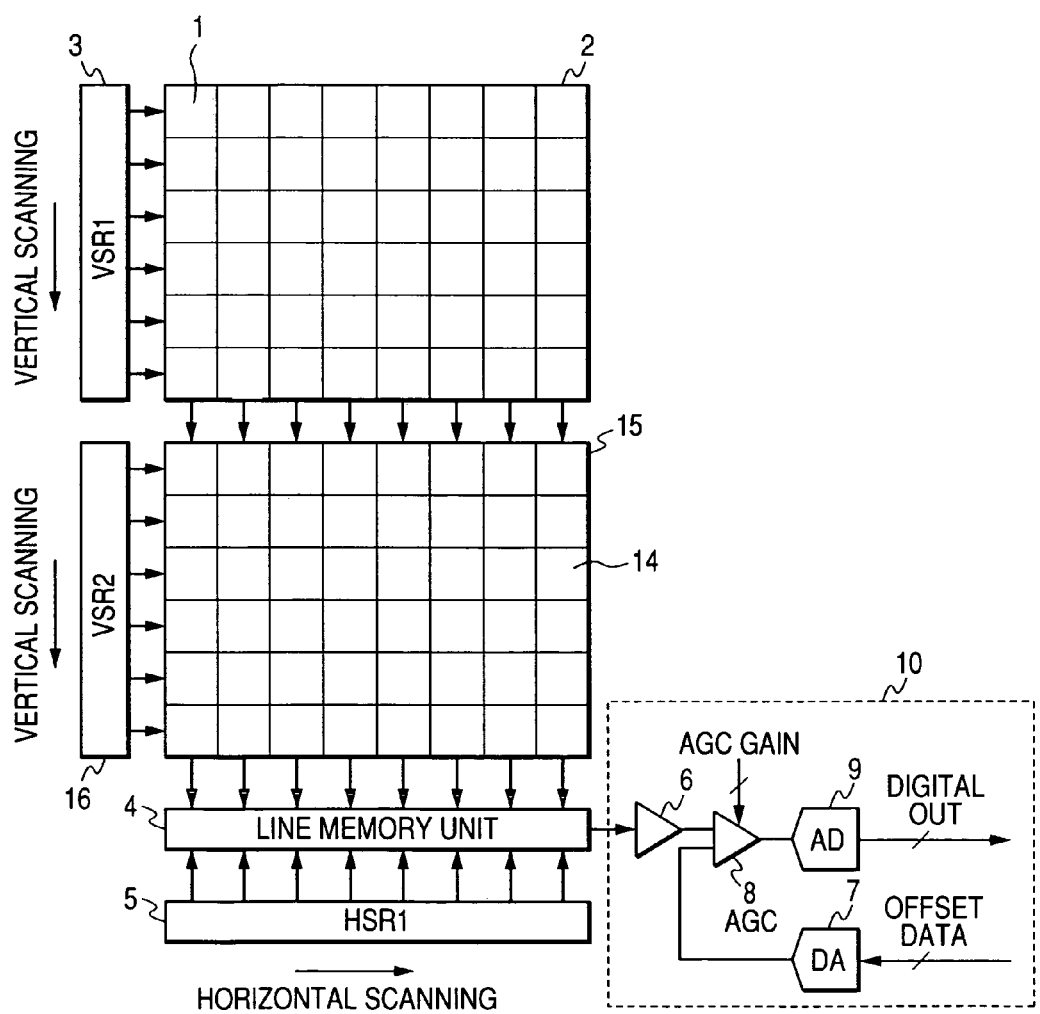
FIG. 1 is a block diagram showing a first embodiment of a solid state image device according to the present invention.
Figure 10:
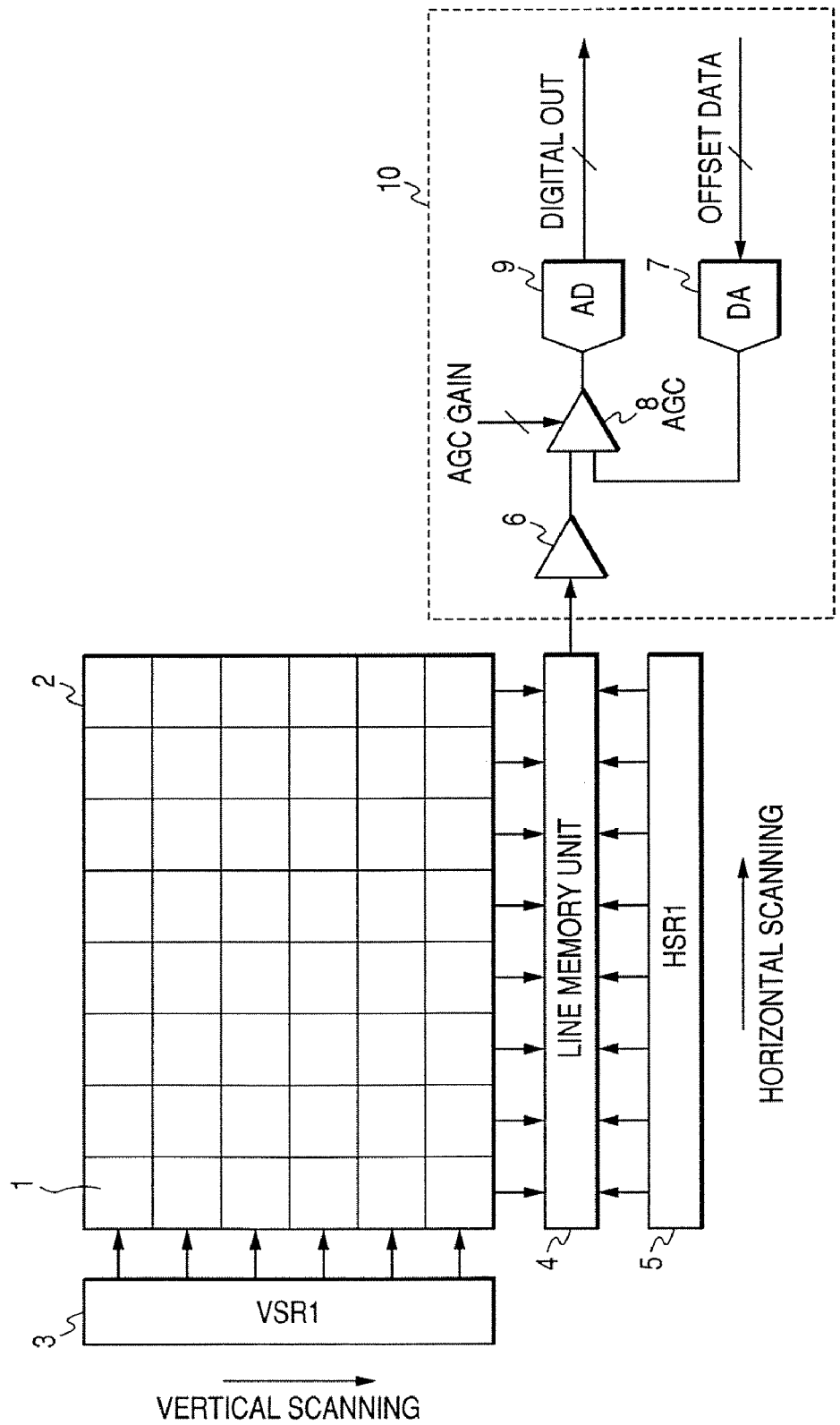
FIG. 10 is a block diagram showing a prior art solid state image device.

FIG. 1 is a block diagram showing a first embodiment of a solid state image device related to the present invention. Here, in FIG. 1, like reference characters designate the same parts in FIG. 10 and descriptions thereon will be omitted. FIG. 1 is different from FIG. 10 in that a frame memory unit 15 with memory element 14 being two-dimensionally arranged equivalent to the photoelectric conversion unit 2 and a second vertical shift register 16 (VSR2) to drive the frame memory unit 15 are present behind the photoelectric conversion unit 2. Here, the arrangement of the pixels and the memory elements is 6 rows by 8 columns, but the arrangement will not be limited thereto but is optional.

In addition, each pixel of the photoelectric conversion unit 2 corresponds one-to-one with each memory element of the frame memory 15 so that the output of each row of the photoelectric conversion unit 2 selected by the first vertical shift register 3 is respectively stored in the memory element of each row of the frame memory unit 15 that is simultaneously selected by the first vertical shift register 16. When all the pixel outputs are stored in the frame memory unit 15 with scan of the vertical shift registers 3 and 16, the second vertical shift register 16 operates individually next. Consequently, it operates to transfer the memory element output of a selected row of the frame memory unit 15 to the line memory unit 4, and subsequently to implement signal transfer to the horizontal output lines as in FIG. 10. In addition, during the period of horizontal scanning from this frame memory unit 15, the photoelectric conversion unit 2 can implement shutter operations with scan of the first vertical shift register 3.

Next, operations of a photoelectric conversion unit of the present embodiment will be described in further detail with reference to FIGS. 2A, 2B, 3A and 3B. FIGS. 2A and 2B are circuit diagrams showing the photoelectric conversion unit 2 shown in FIG. 1 likewise FIG. 11, a frame memory unit 15, a line memory unit 4 and an operational amplifier 6, being a part of the read out circuit 10, of bringing signals from the line memory unit 4 into impedance conversion. In the drawing, description of those with the same reference characters as in FIG. 11 will be omitted.

Figure 11:
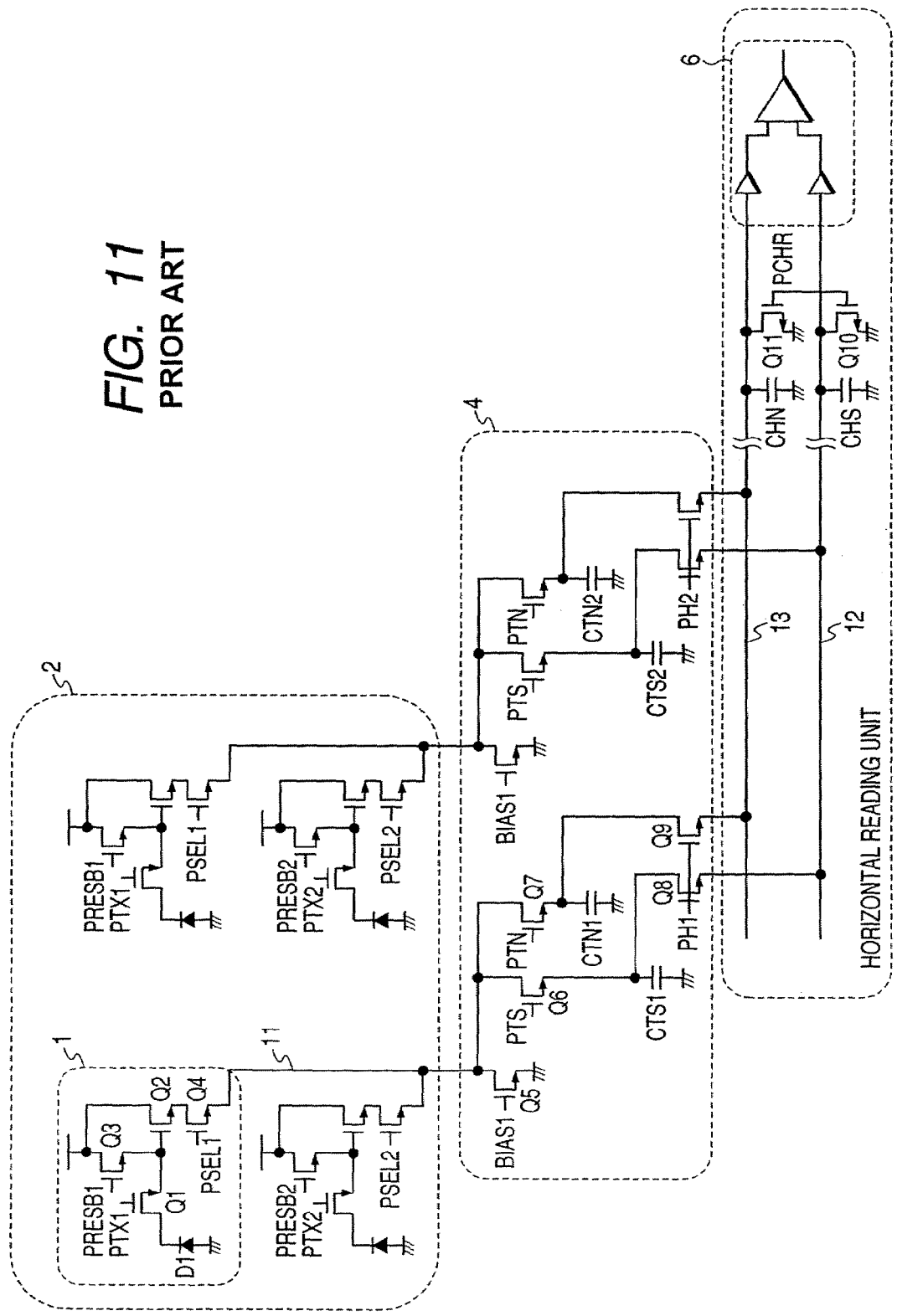
FIG. 11 is a circuit diagram of the solid state image device in FIG. 10 showing a photoelectric conversion unit, a line memory unit and an operational amplifier being a part of a read out circuit.

FIGS. 2A and 2B are different from FIG. 11 in that a frame memory unit 15 with memory elements 14 equivalent to the photoelectric conversion unit 2 in number being two-dimensionally arranged is added between the photoelectric conversion unit 2 and the line memory unit 4. Although an example with 2 rows by 2 columns is described here, the arrangement of the photoelectric conversion unit 2 and the frame memory unit 15 will not be limited thereto but is optional.

In the drawing, a memory element 14 is configured by a first and a second sample hold capacitors CMS and CMN, a first and a second sample hold switches Q12 and Q13, a first and a second operational amplifiers OP1 and OP2 and a first to a third row selection switches Q15, Q16 and Q17. Here, Q18 and Q19 are respectively constant current sources to become bias sources of the first and the second operational amplifiers OP1 and OP2 of the memory element 14. Also here, for simplifying the description, the first and the second vertical shift registers 3 and 16 and the horizontal shift register 5 are omitted.

Figure 3A:
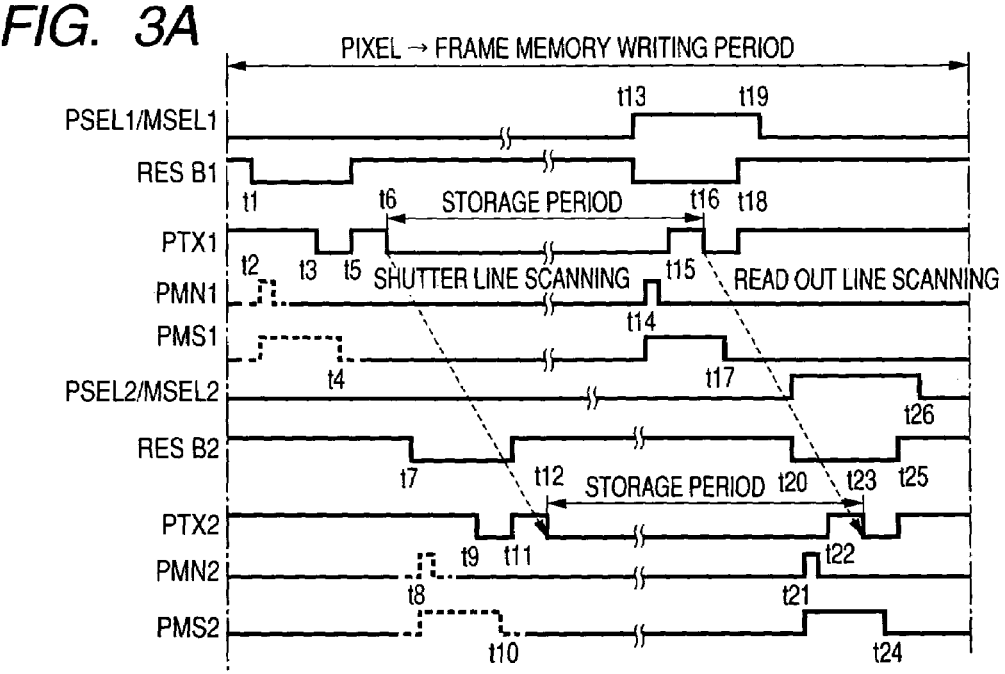
FIGS. 3A and 3B are timing charts showing operations of the first embodiment.
Figure 3B:
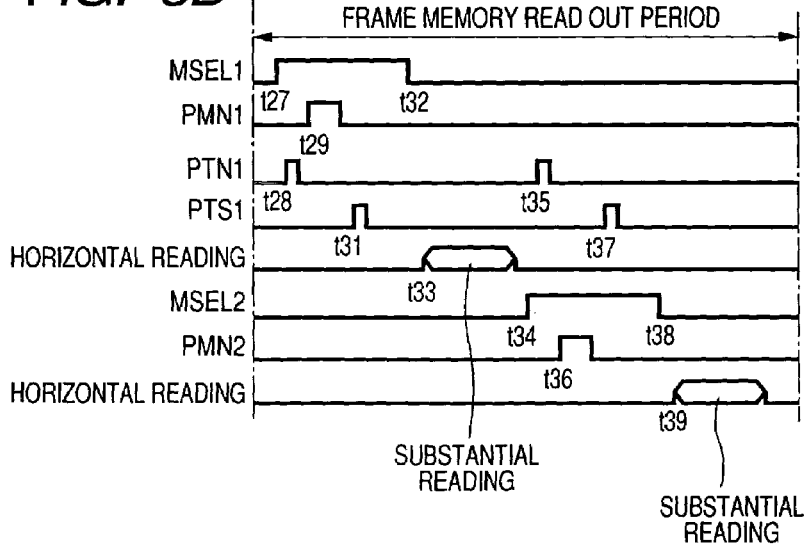

FIGS. 3A and 3B are timing charts showing operations of the circuit in FIGS. 2A and 2B. FIG. 3A is a timing chart showing operations up to storage of signals from the photoelectric conversion unit 2 to the frame memory unit 15. FIG. 3B is a timing chart showing operations up to horizontal read out from the frame memory unit 15. At first, in FIG. 3A, when the first and the second vertical shift registers 3 and 16 operate, the photoelectric conversion unit 2 outputs a reset pulse PRESB1, a transfer pulse PTX1, a row selection pulse PSEL1 to 1st row selected by the first vertical shift register 3 as in the prior art example in FIG. 11.

On the other hand, the frame memory unit 15 outputs a first and a second sample hold pulses PMS1 and PMN1 and a 1st and a 2nd row selection pulses MSEL1B and MSEL1 to the 1st row selected by the second vertical shift register 16. Here, the 1st and the 2nd row selection pulses MSEL1B and MSEL1 are in an inverted relation. Likewise the description in FIG. 12, in order to make descriptions readily understandable, read out line scanning will be described first.

In FIG. 3A, read out line scanning of the photoelectric conversion unit 2 starts at the time t13, a row selection pulse PSEL1 will move to a high level while a reset pulse PRES1B will move to a low level. Accordingly, a source follower Q2 of the selected row is connected to the vertical output line 11 and a gate thereof will come into a floating state so as to become capable of accepting a signal charge from the photodiode D1.

At this time, in the frame memory unit 15, a 1st row selection pulse MSEL1B move to a low level (not shown) while a 2nd row selection pulse MSEL1 will move to a high level so that the operational amplifiers OP1 and OP2 will come into an electrically conductive state with respective bias sources Q18 and Q19 respectively. Reset noise Vn of the gate of the source follower Q2 of the pixel to arise at this time undergoes sampling as follows. That is, in the frame memory unit 15, a first and a second sample hold pulses PMS1 and PMN1 move to a high level at simultaneously at the time t14 to turn both of a first and a second sample hold switches Q12 and Q13 ON, and thereby sampling is implemented to a second sample hold capacitor CMN via the first operational amplifier OP1.

Next, the second sample hold pulse PMN1 drops to a low level so that a second sample hold capacitor CMN enters a hold state, but the first sample hold pulse PMS1 remains at a high level. Thereafter, in the photoelectric conversion unit 2, the transfer pulse PTX1 will be in a high level during the period of the time t15 to t16 so that the transfer switch Q1 is turned ON, then the signal electric charge stored in the photodiode D1 is transferred to the gate of the source follower Q2 and undergoes voltage conversion with the gate capacitance of Q2. As a result, the source follower Q2 outputs a sum Vs+Vn between a component Vs derived by a signal electric charge and a reset noise component Vn, which undergoes sampling to the first sample hold capacitor CMS with the first sample hold switch Q1.

Thereafter, the sample hold pulse PMS1 will move to a low level at the time t17, and the first sample hold capacitor CMS will get to a hold state. Next, at the time t18, PTX1 and PRES1B return to high levels, and the gates of the photodiode D1 and the source follower Q2 are short-circuited to a reset potential (here, power supply) by a reset switch Q3 are both reset. Moreover, at the time t19, in both of the photoelectric conversion unit 2 and the frame memory unit 15, the row selection pulses PSEL1 and MSEL1 move to a low level so that row selection is canceled.

Figure 12:
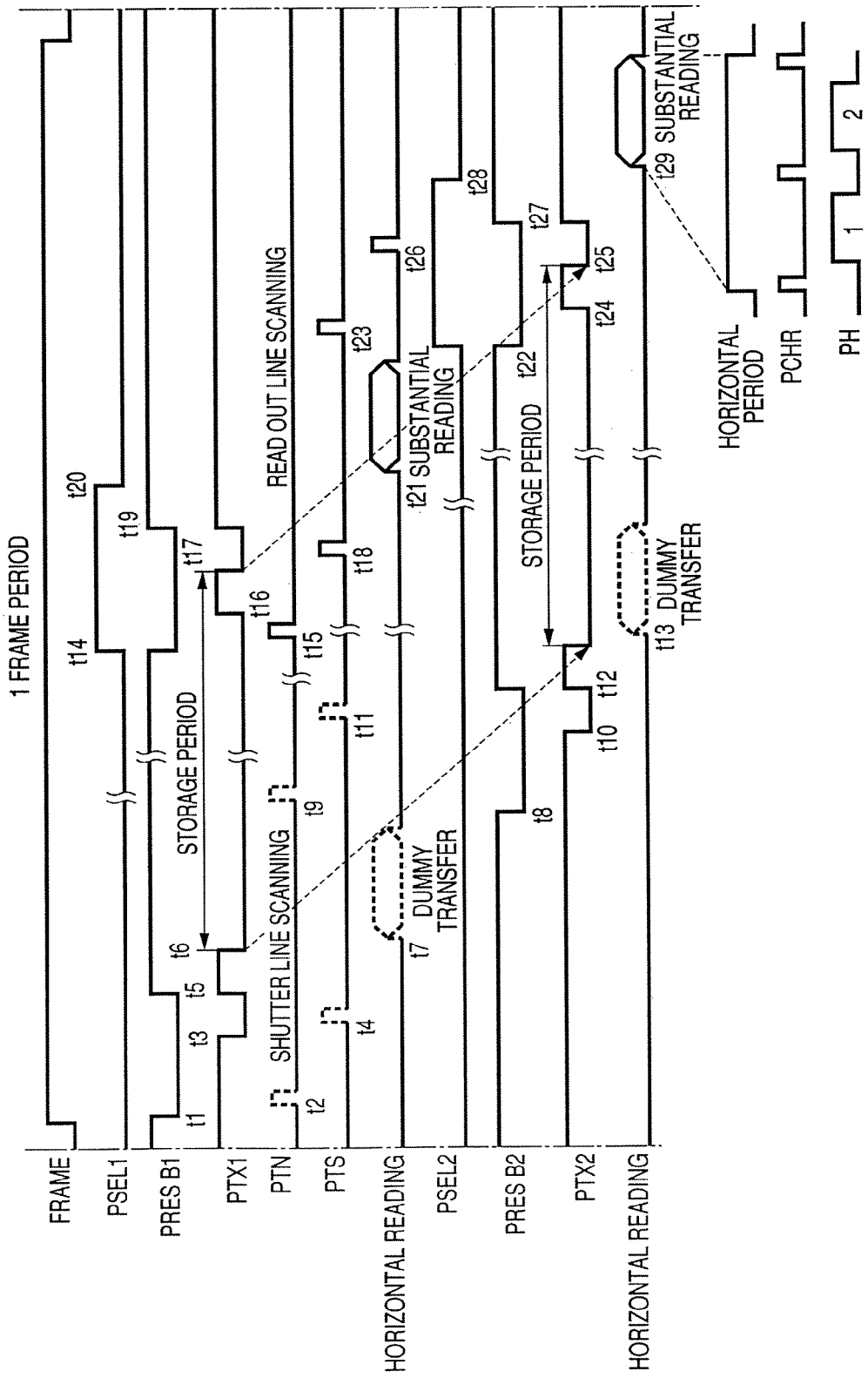
FIG. 12 is a timing chart showing operations of the solid state image device in FIG. 10.

In the prior art example in FIG. 12, this is followed by a horizontal read out operation, but in the present embodiment, horizontal read out is not implemented. That is, the row selection pulses PSEL2 and MSEL2 immediately move to a high level with scan of the first and the second vertical shift registers at the time t20 to implement the above described operation again and thereby storage from the next selected row of the photoelectric conversion unit 2 to the next selected row of the frame memory unit 15 is implemented.

Also in the present embodiment, exactly the same operations as the read out operations is implemented prior to read out scanning as in the prior art example in FIG. 12 and thereby a slit rolling shutter operation is implemented electrically inside the solid state image device. That is, in FIG. 3A, an operation for a first time of the vertical shift register starts at the time t1. Difference from the above described read out line scanning is that the row selection pulse PSEL1 remains at a low level. The reason thereof is that there is no need to make an access to the frame memory since an object of a shutter operation is to rest a pixel.

Therefore, according to the present embodiment, the photoelectric conversion unit 2 and the frame memory unit 15 will be completely separated during a shutter operation so as to be capable of operating independently. In addition, also here in order to make storage hours constant, also at the time of shutter operations, time equivalent to time required for writing to the frame memory will be required. These pulses are indicated by broken lines in FIGS. 3A and 3B, but these pulses are not always required to be outputted.

FIG. 3B is a timing chart showing operations of horizontal scanning from the frame memory unit 15 during the period of a shutter operation. Here, the signal read out here is a signal of the first preceding frame. According to the above described drawing, a row selection pulse MSEL1 moves to a high level at the time t27 (the same time as the time t1) with scanning of the second vertical shift register 16 so that the first and the second operational amplifiers OP1 and OP2 will get electrically conductive with respective bias sources Q18 and Q19.

Next, the transfer pulse PTN to the line memory moves to a high level at the time t28 so that the signal stored in the second sample hold capacitor CMN, that is, reset noise Vn of a pixel is transferred to the line memories CTN1 to CTN2. Next, a second sample hold pulse PMN1 moves to a high level to turn ON the sample hold switch Q13, the signal stored in the first sample hold capacitor CMS, that is, Vs+Vn, undergoes sampling to the second sample hold capacitor CMN. Thereafter, the transfer pulse PTS moves to a high level at the time t31 and is transferred to the line memories CTS1 to CTS2. In addition, the row selection pulse MSEL1 moves to a low level and the frame memory unit 15 and the line memory unit 4 are separated.

Thus, signal transfer from a selected row of the frame memory unit 15 to the line memory unit 4 is completed, the signal of each pixel retained in the line memory unit 4 is sequentially read out by scanning of the horizontal shift register 5 at the time t33. Since this operation is likewise the operation shown in FIG. 12, description thereof will be omitted. In addition, the horizontal read out operation is over, a next row of the frame memory unit 15 is selected by scanning of the second vertical shift register 16 and the above described operations are repeated.

The time t38 when the last row selection of the frame memory unit 15 is over should come prior to the time t13 when read out line scanning from the photoelectric conversion unit 2 starts. Thus, all the image information of the first preceding frame will become feasible to be read out during a period of a shutter operation.

As shown in the present first example, the frame memory unit 15 is configured by a first and a second sample hold circuits which are brought into subordinate connection. Advantage of this configuration is that the reset noise component of a pixel Vn and the sum of the signal component and the noise component Vs+Vn undergo signal transfer to travel the same route to the line memory unit 4. That is, with the offset voltage of the first and the second operational amplifiers OP1 and OP2 being respectively Vof1 and Vof2, voltages transferred to the line memories CTN1 and CTS1 from the frame memory unit 4 are respectively expressed by:

$$VCTN1=Vn+Vof1+Vof2$$

$$VCTS1=Vs+Vn+Vof1+Vof2.$$

The voltage on this line memory undergoes subtraction processing with the subsequent read out circuit 10, and therefore will be respectively cancelled.

That is, being expressed by $$VCTS1-VCTN1=Vs,$$

only the signal voltage is read out. If signals and noise are read out from the frame memory unit 4 through different routes, offsets on respective routes cannot be removed and therefore will result in giving rise to errors.

Figure 15:
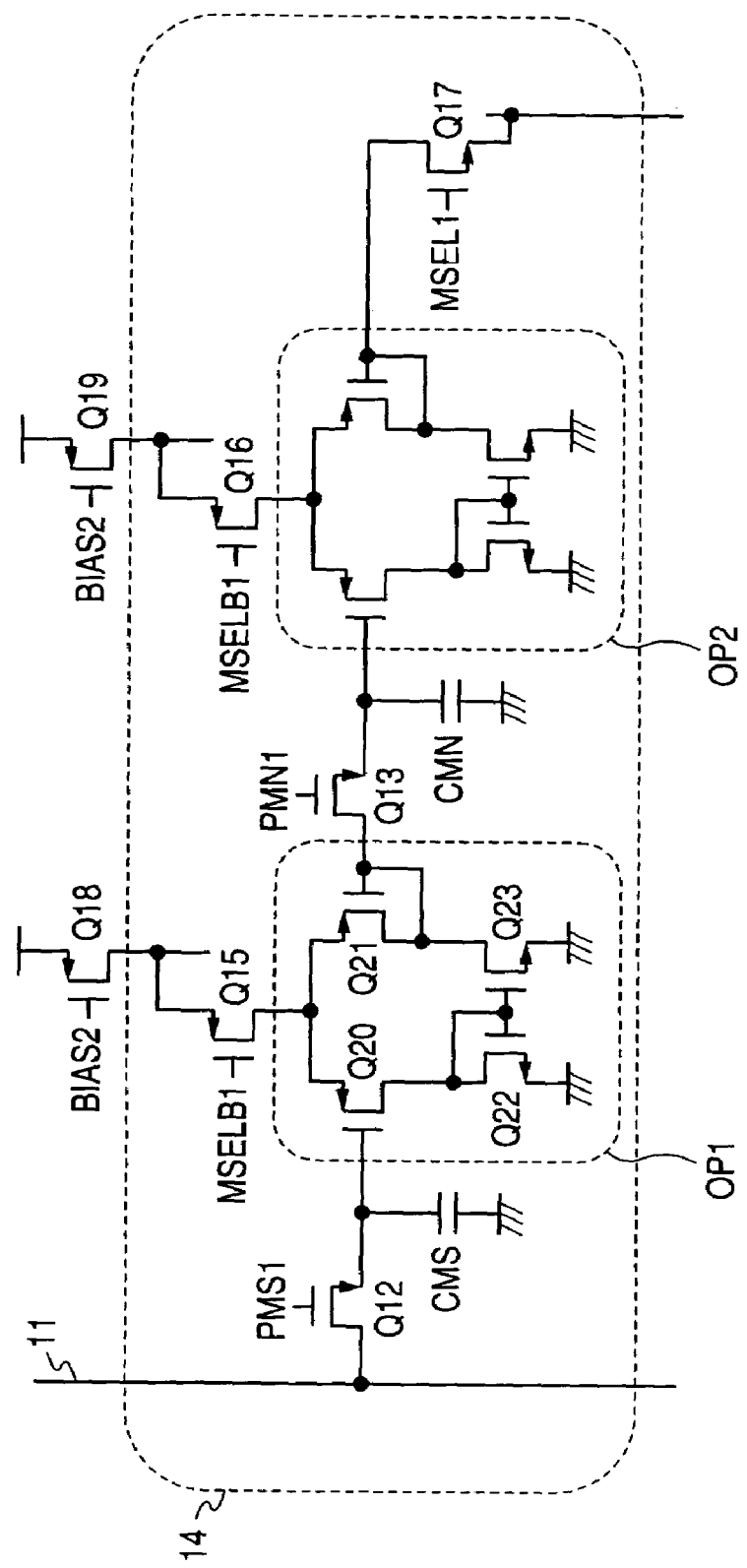
FIG. 15 is a circuit diagram describing an example of an inner circuit of operational amplifiers.

Here, sample hold operations inside the frame memory unit 15 were described with the first and the second operational amplifiers OP1 and OP2. FIG. 15 is a circuit diagram describing an inner circuit of operational amplifiers OP1 and OP2, and in the drawing, the operational amplifiers OP1 and OP2 are configured by a buffer amplifier consisting of a differential pair Q20 and Q21 of a PMOS transistor and active loads Q22 and Q23 of an NMOS transistor. Here the aforementioned row selection switches Q15 and Q16 are turned ON with the MSELB1 moving to a low level, the bias sources Q18 and Q19 will respectively get electrically conductive with the differential pair of the operational amplifiers OP1 and OP2 so that the operational amplifiers OP2 and OP2 will become enabled. Here, the operational amplifier was described with a configuration of a buffer amplifier, but will not be limited thereto. For example, employing configuration of amplifying signals by applying a voltage gain more than 1, alleviation of influence of random noise of a subsequent stage read out circuit unit 10 and improvement of S/N proportion will become feasible with the operational amplifiers. On another note, even lacking the operational amplifiers, voltage amplifying means that can apply a voltage gain more than 1 will do. In the present invention, means that can apply the voltage gain more than 1 will be defined as voltage amplifying means. In addition, an operational amplifier is excellent in features of supply-voltage rejection ratio and the like compared with other buffer means such as a source follower etc. and therefore is advantageous that a stable system can be configured.

Figure 4:
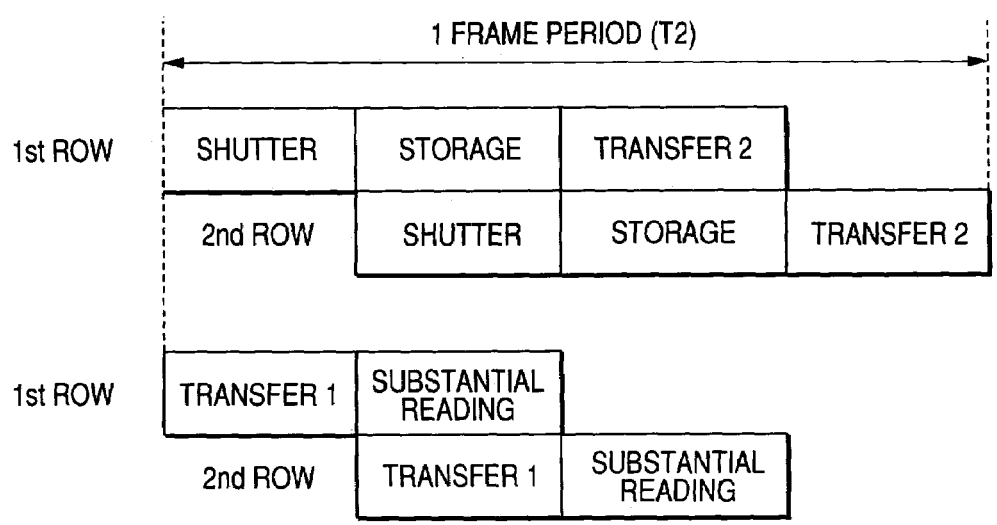
FIG. 4 is a diagram describing 1 frame read out hours of the first embodiment.
Figure 13:
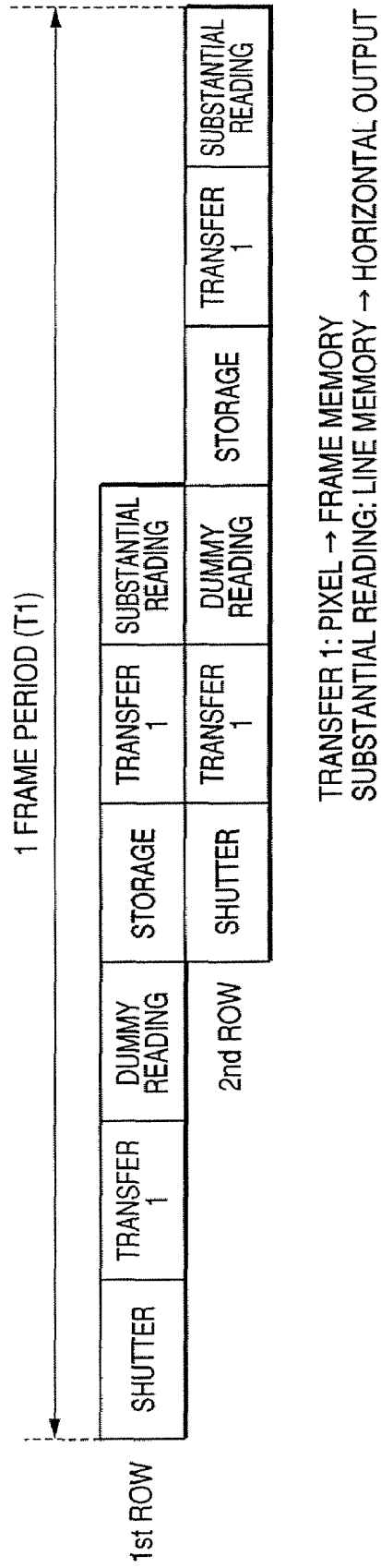
FIG. 13 is a diagram describing 1 frame read out hours of the solid state image device in FIG. 10.
Figure 14:
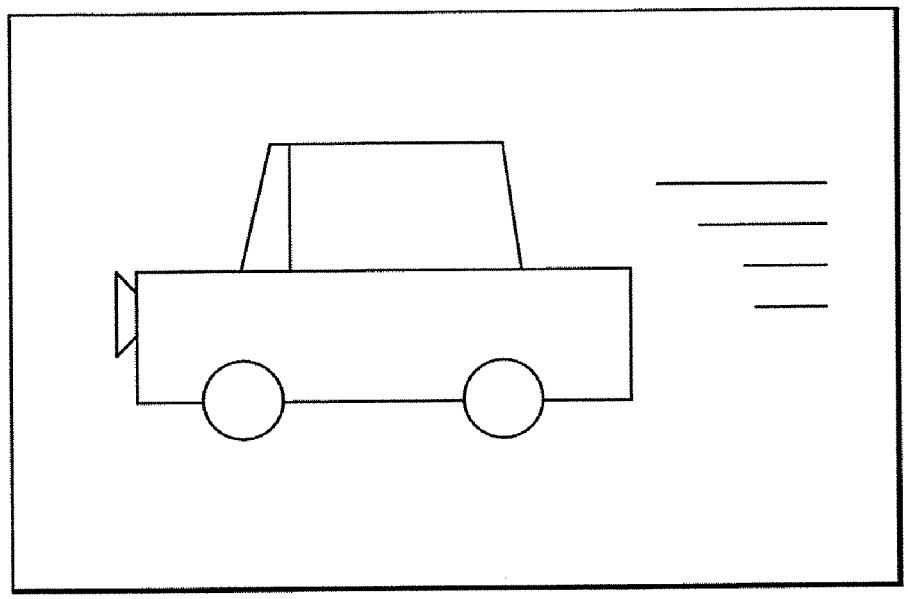
FIG. 14 is a diagram describing a problem of the solid state image device in FIG. 10.
Figure 14:
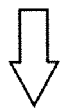
Figure 14:
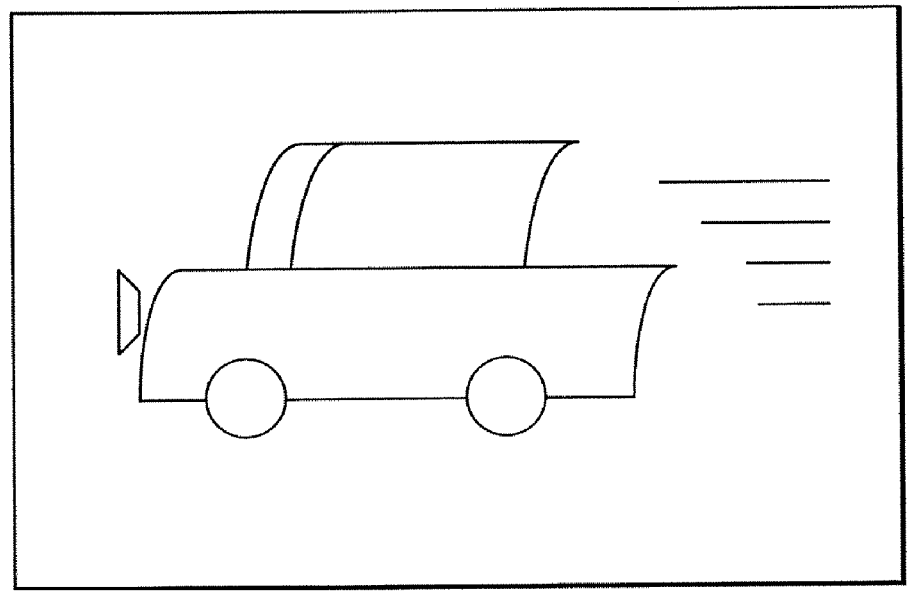

As described above, the solid state image device according to the present embodiment has the frame memory unit 15, and therefore it is not necessary to implement horizontal read out during one scanning period of the vertical shift register 3 of driving the photoelectric conversion unit 2 as shown in FIG. 4 and moreover read out operations from the frame memory unit 15 during the period of a shutter operation of the photoelectric conversion unit 2 will become feasible. Accordingly, the read out period T2 for 1 frame will be able to be cut by a margin large than in a prior art example shown in FIG. 13.

Second Embodiment

Figure 5:
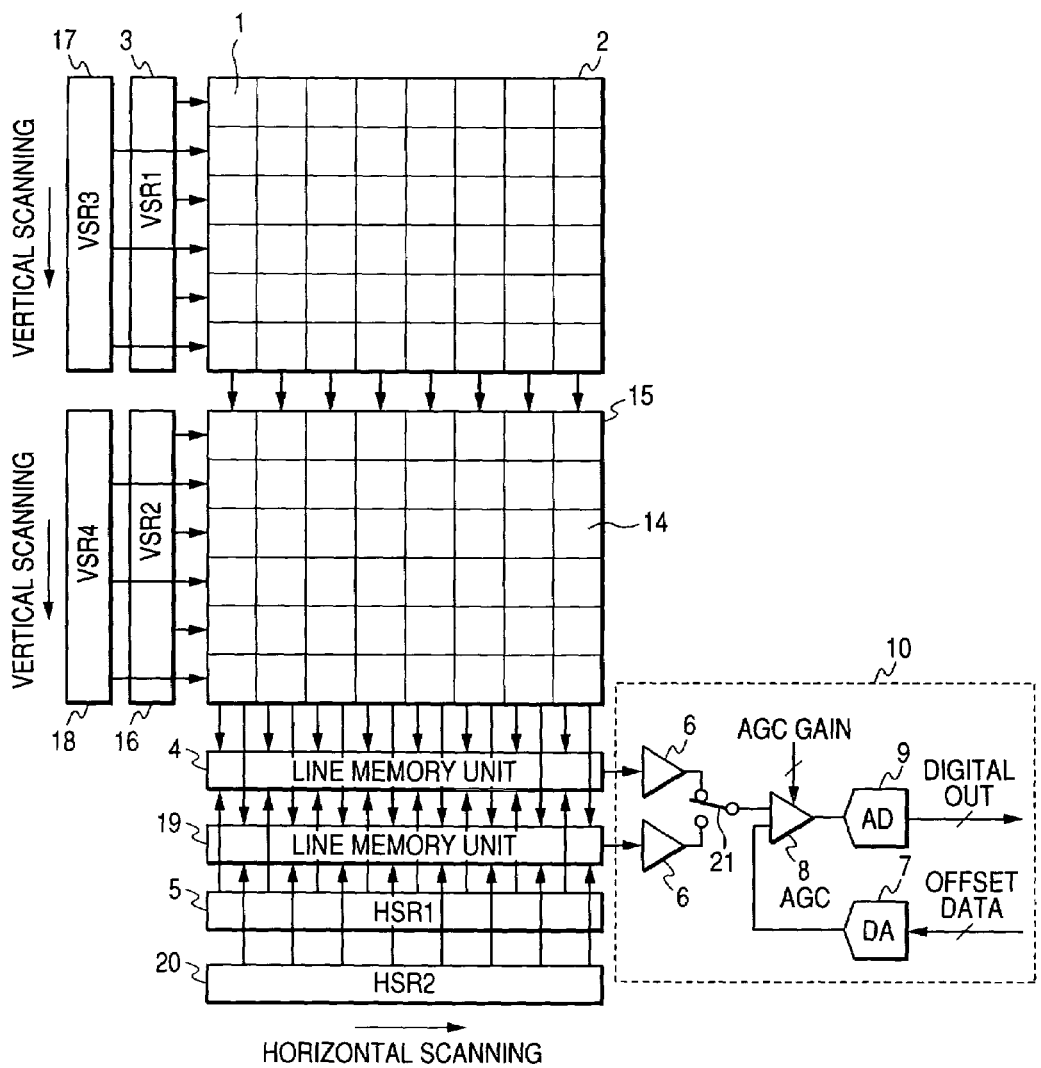
FIG. 5 is a block diagram showing a second embodiment of the present invention.

FIG. 5 is a block diagram showing a second embodiment of the present invention. Here, in FIG. 5, like reference characters designate the same parts in FIG. 1 and descriptions thereon will be omitted. FIG. 5 is different from FIG. 1 in that a photoelectric conversion unit 2 and a frame memory unit 15 respectively have second vertical shift registers 17 and 18. Moreover, FIG. 5 is different from FIG. 1 in that a second line memory 19, a horizontal shift register 20 and operational amplifiers 6 are present and outputs of the first and the second operational amplifiers 6 are selected by a switch 21 and inputted to a gain control amplifier 8. Here, the arrangement of the pixels and the memory elements is 6 rows by 8 columns, but the arrangement will not be limited thereto but is optional.

In addition, these two units each of the vertical shift registers 3, 17 and 16, 18 are driven by shift pulses with 180-degree phase discrepancy and operate so as to select the photoelectric conversion unit 2 and the frame memory unit 15 on every other row. That is, the pixel signal of a row selected by the first vertical shift register 3 of the photoelectric conversion unit is stored in a memory element selected by the first vertical shift register 16 of the frame memory unit. Operations of the second vertical shift registers 17 and 18 respectively of the photoelectric conversion unit and the frame memory unit are as described above.

On the other hand, also as for read out operations from the frame memory unit 15, the vertical shift registers 16 and 18 are driven by the shift pulses with 180-degree phase discrepancy so that the memory element signal of the row selected by the first vertical shift register 16 is transferred to the first line memory unit 4. In addition, the memory element signal of the row selected by the second vertical shift register 18 is transferred to the second line memory unit 19. For a horizontal read out operation from the line memory, at first, signals retained in the first line memory unit 4 subject to scanning of the first horizontal shift register 5 is read out. At this time, a selector switch 21 makes the signal charge of the first line memory unit 4 electrically conductive with the operational amplifier 6 for impedance conversion and inputs it to a gain control amplifier 8.

When a read out operation of the first line memory unit 4 is over, signals retained in the second line memory unit 19 subject to scanning of the second horizontal shift register 20 are read out. At this time, the switch 21 is selected to the side of the second line memory unit 19. So far, when read out operations for two rows from the line memory is completed, the next row of the photoelectric conversion unit 2 and the frame memory unit 15 is selected with scanning of the vertical shift registers 3 and 16 and subsequently the above described operations are repeated.

Figure 6B:
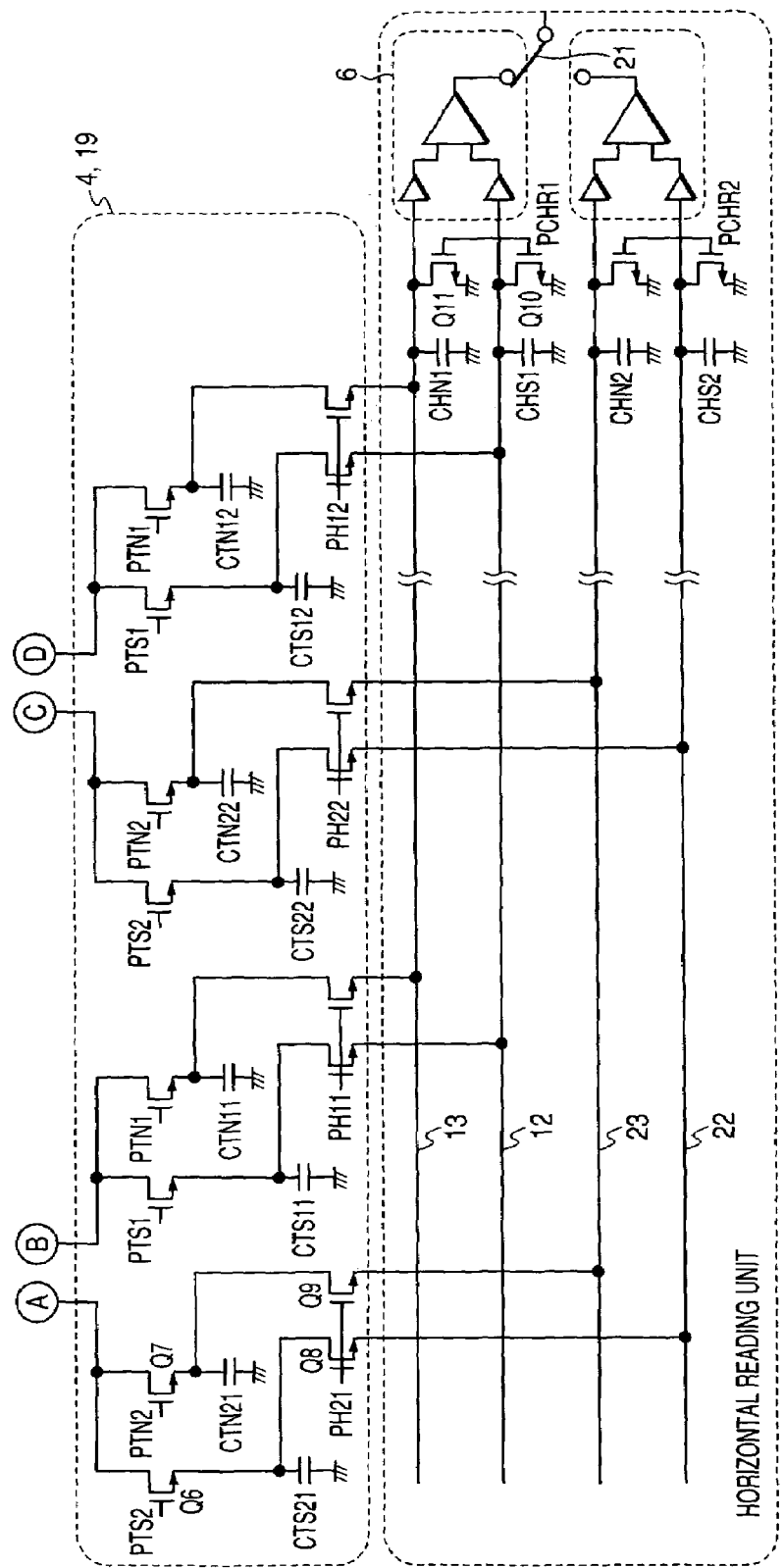
FIG. 6 is comprised of FIGS. 6A and 6B showing circuit diagrams of the second embodiment showing a photoelectric conversion unit, a frame memory unit, a line memory unit and an operational amplifier 6 being a part of a read out circuit.

Next, operations of the solid state image device of the present embodiment will be described in detail with reference to FIGS. 6A, 6B, 7A and 7B. FIGS. 6A and 6B are circuit diagrams showing the photoelectric conversion unit 2 shown in FIG. 5 likewise FIGS. 2A and 2B, a frame memory unit 15, line memory units 4 and 19 and an operational amplifier 6, being a part of the read out circuit 10, of bringing signals from the line memory units 4 and 19 into impedance conversion. In the drawing, description of those with the same reference characters as in FIGS. 2A and 2B will be omitted. In addition, an example with 2 rows by 2 columns will be described here, but the arrangement of the photoelectric conversion unit 2 and the frame memory unit 15 will not be limited thereto but is optional.

FIGS. 6A and 6B are different from FIGS. 2A and 2B in that pixels on the 1st row of the photoelectric conversion unit 2 are connected to the memory elements on the 1st row of the frame memory unit 15 and pixels on the 2nd row of the photoelectric conversion unit 2 are connected to the memory elements on the 2nd row of the frame memory unit 15 respectively. Moreover, FIGS. 6A and 6B are different from FIGS. 2A and 2B in that an output of the operational amplifier OP2 on the 1st row of the frame memory unit 15 is connected to the line memories CTS11 to CTS12 and CTN11 to CTN12 and an output of the operational amplifier OP2 on the 2nd row is connected to the line memories CTS21 to CTS22 and CTN21 to CTN22 respectively. Accordingly, respective line memories are configured to be connected to horizontal read out lines 12, 13 and 22, 23 respectively to output to the subsequent stage via the operational amplifier 6 and the selector switch 21.

Figure 7A:
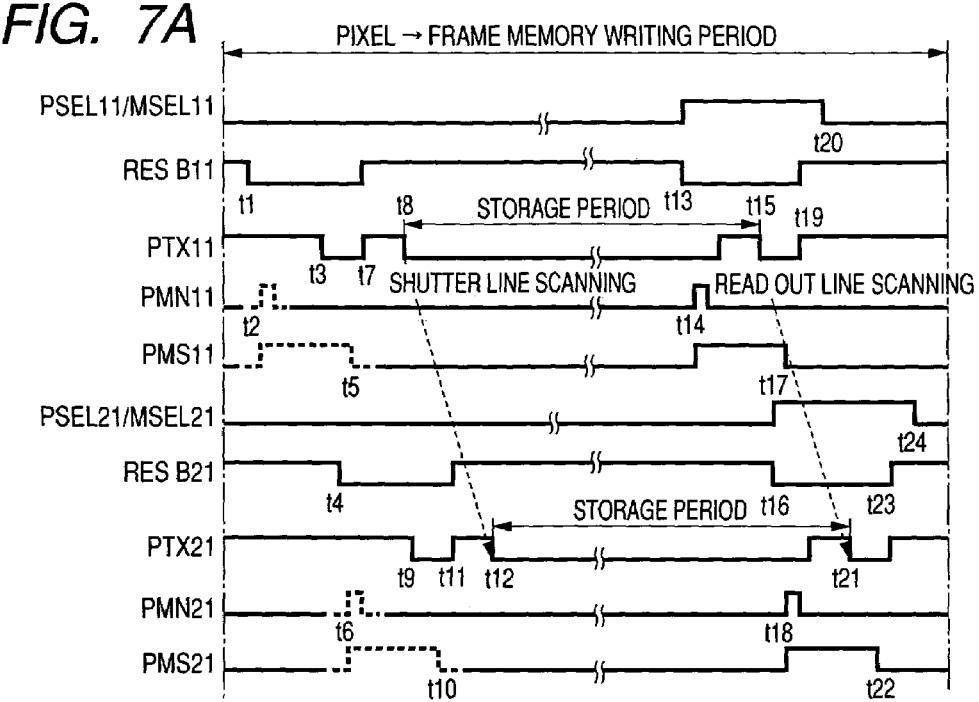
FIGS. 7A and 7B are timing charts showing operations of the second embodiment.
Figure 7B:
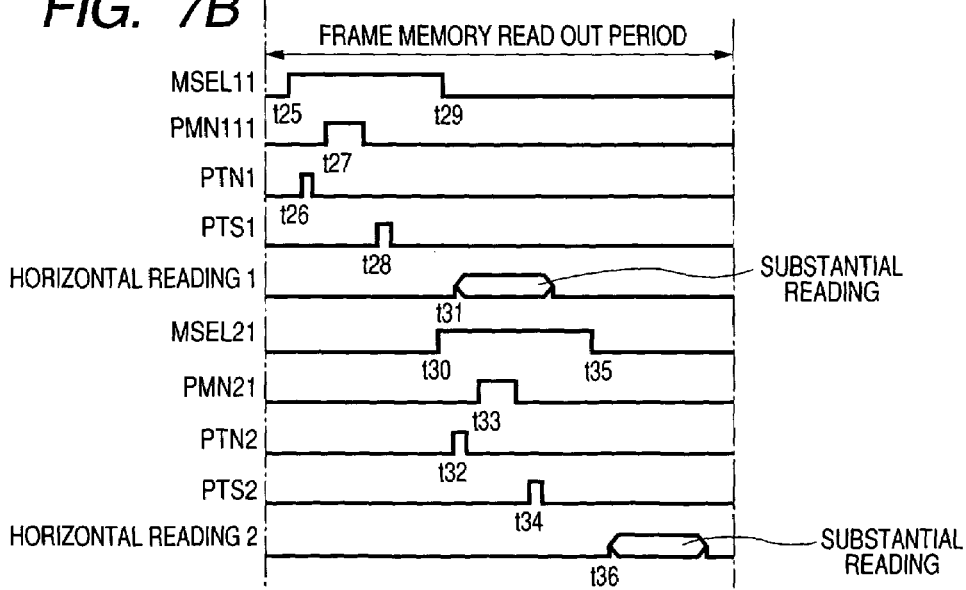

FIGS. 7A and 7B are timing charts showing operations of the circuit in FIGS. 6A and 6B. FIG. 7A is a timing chart showing operations up to storage of signals from the photoelectric conversion unit 2 to the frame memory unit 15. FIG. 7B is a timing chart showing operations up to horizontal scanning from the frame memory unit 15. At first, in FIG. 7A, when the first vertical shift registers 3 and 16 of the photoelectric conversion unit 2 and the frame memory unit 15 operate, the photoelectric conversion unit 2 outputs a reset pulse PRESB1, a transfer pulse PTX1, a row selection pulse PSEL1 to a 1st row selected as in FIG. 3A described in the first embodiment.

On the other hand, the frame memory unit 15 outputs a first and a second sample hold pulses PMS1 and PMN1 and a first and a 2nd row selection pulses MSEL1B and MSEL1 to the 1st row selected by the vertical shift register 16. Difference from the first embodiment is that the photoelectric conversion unit 2 and the frame memory unit 15 have the second vertical shift registers 17 and 18 respectively, and therefore can be driven in a fashion independent of the first vertical shift registers 3 and 16.

The photoelectric conversion unit 2 outputs a reset pulse PRESB2, a transfer pulse PTX2, a row selection pulse PSEL2 to a 2nd row selected by the vertical shift register 17. On the other hand, the frame memory unit 15 outputs a first and a second sample hold pulses PMS2 and PMN2 and a first and a 2nd row selection pulses MSEL2B and MSEL2 to the 2nd row selected by the vertical shift register 18. Causing the shift pulses of the first and the second vertical shift registers 3, 16 and 17, 18 to undergo 180-degree phase shift, scanning of the second vertical shift registers 17 and 18 starts in the middle of scanning of the first vertical shift registers 3 and 16.

That is, in FIG. 7A, since the second scanning starts at the time t17 prior to conclusion of the first scanning that has started at the time t13, difference of time for the adjacent rows are cut to half a row. In addition, a horizontal read out operation from the frame memory during the period of a shutter operation is shown in FIG. 7B. That is, at first, by scanning of the first vertical shift register 16, a signal is transferred from the row of the frame memory unit 15 selected with the row selection pulse MSEL1 to the first line memory 4 at the time t25 (the same time as the time t1). At the time t31 horizontal scanning starts from the first line memory unit 4, but since the frame memory unit 15 has the second vertical shift register 18, this scanning enables transfer of signals of rows other than those driven by the first vertical shift register 16 to the second line memory 20.

That is, in FIG. 7B, the row selection pulse MESL2 is outputted by scanning of the second vertical shift register 18 at the time t30 and is transferred to the second line memory 20 during the period of horizontal read out operations of the first line memory 4. Thus likewise in FIG. 7A, as for the horizontal read out time, time difference of the adjacent rows is cut to half a row.

Figure 8:
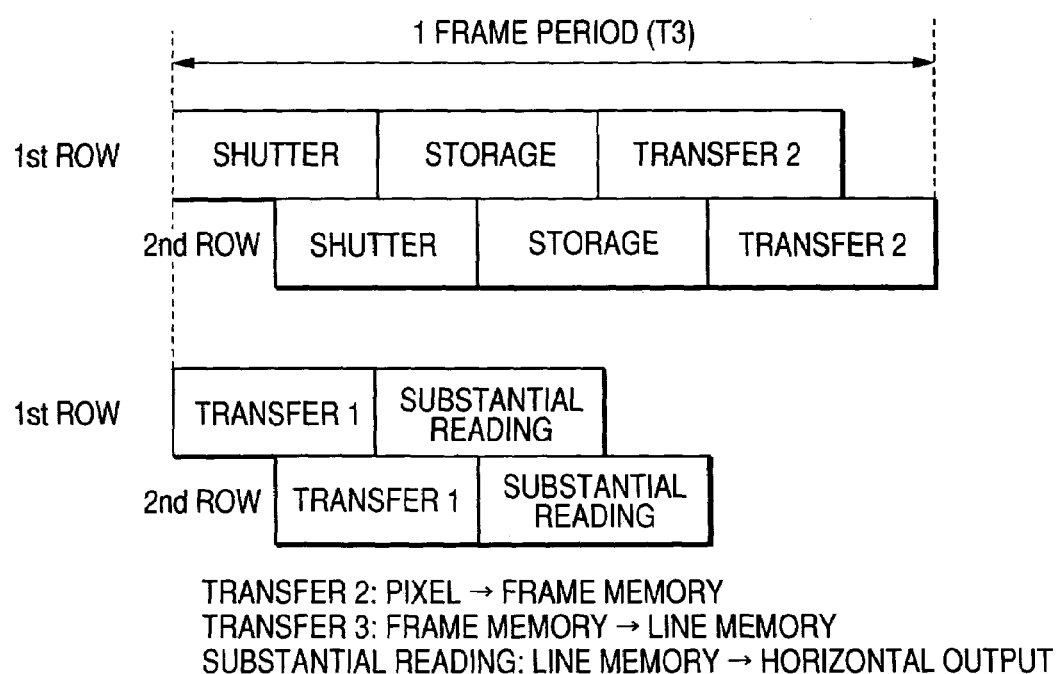
FIG. 8 is a diagram describing one frame read out hours of the second embodiment.

As described above, in the present embodiment, two units of vertical shift registers each of the photoelectric conversion unit 2 and the frame memory 15 are driven by shift pulses with 180-degree phase difference. Consequently, as shown in FIG. 8, the adjacent rows will be able to be scanned in parallel, enabling further cut of 1 frame read out period T3 than the first embodiment shown in FIG. 4.

Third Embodiment

Figure 9:
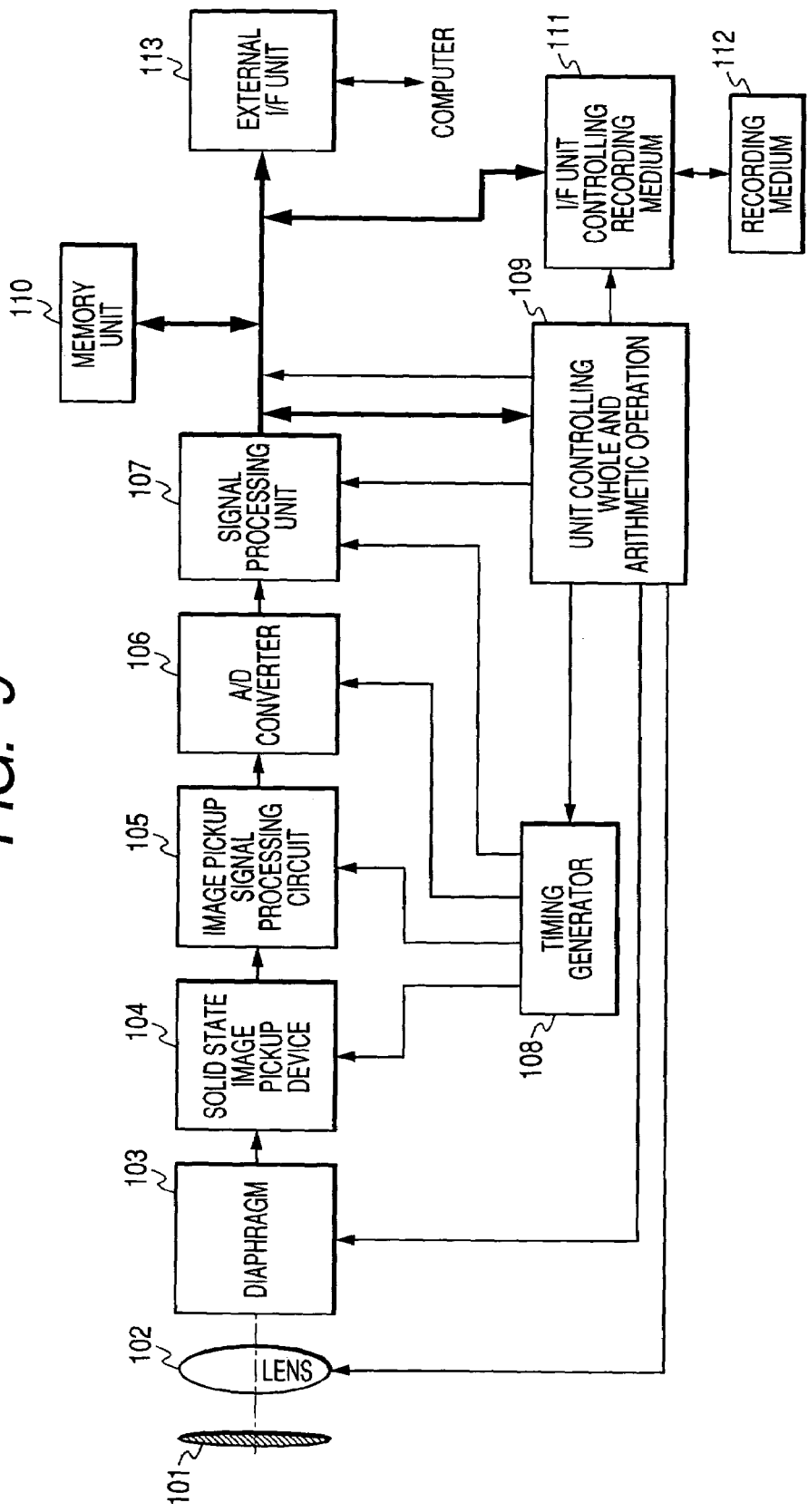
FIG. 9 is a block diagram showing an embodiment of a still camera with a solid state image device of the present invention.

FIG. 9 is a block diagram showing an embodiment of a still camera with a solid state image device of the present invention as described above. In FIG. 9, reference numeral 101 denotes a barrier that combines protection of a lens and a main switch, reference numeral 102 denotes a lens of forming an optical image of an object into a solid state image device 104, reference numeral 103 denotes a diaphragm of varying a light quantity that has passed the lens 102 and reference numeral 104 denotes a solid state image device for taking in an object that has undergone image forming with the lens 102 as an image signal. The solid state image device 104 corresponds with the solid state image device of the present invention described above.

Reference numeral 106 denotes an A/D converter of implementing digital-analogue conversion on the image signal outputted from the solid state image device 104. Reference numeral 107 denotes a signal processing unit of implementing respective kinds of corrections and data compression onto image data outputted from the A/D converter 106, reference numeral 108 denotes a timing generator of outputting respective kinds of timing signals to the solid state image device 104, the image pickup signal processing circuit 105, the A/D converter 106 and the signal processing unit 107.

In addition, reference numeral 109 denotes a unit controlling whole and arithmetic operation of controlling respective kinds of arithmetic operations and a still video camera in its entirety. Reference numeral 110 denotes a memory unit for temporally storing image data. Reference numeral 111 denotes an I/F (interface) unit controlling recording medium for recording to or reading out from a recording medium, reference numeral 112 denotes a removable recording medium such as a semiconductor memory etc. for recording or reading out image data and reference numeral 113 denotes an external I/F (interface) unit for communicating with an external computer etc.

Next, operations of a still video camera of the present embodiment at the time of filming will be described. At first, when the barrier 101 is opened, a main power supply is turned ON, next a power supply for a control system is turned ON and moreover a power supply for circuits of the filming system such as the A/D converter 106 etc. is turned on. Then, in order to control light exposure, the unit controlling whole and arithmetic operation 109 opens the diaphragm 103, then a signal outputted from the solid state image device 104 is converted into a digital signal with the A/D converter 106 and thereafter is inputted to the signal processing unit 107. Based on those data, an arithmetic operation of exposure is implemented with the unit controlling whole and arithmetic operation 109.

Based on the result of this photometry, brightness is determined, and according to the result, the unit controlling whole and arithmetic operation 109 controls the diaphragm 103. Next, based on the signal outputted from the solid state image device 104, high frequency components are taken out to implement arithmetic operation of the distance to an object is implemented by the unit controlling whole and arithmetic operation 109. Thereafter, the lens 102 is driven to determine whether or not an in-focus state has been derived, and in case of determination that an in-focus state has not been derived yet, the lens 102 is driven again to implement ranging. In addition, after an in-focus state is confirmed, substantial exposure starts.

When exposure is over, image signals outputted from the solid state image device 104 undergo A/D conversion with the A/D converter 106, pass the signal processing unit 107 and are written to the memory unit 110 with the unit controlling whole and arithmetic operation 109. Thereafter, the data stored in the memory unit 110 passes the I/F unit controlling recording medium 111 controlled by the unit controlling whole and arithmetic operation 109 and recorded in a removable recording medium 112 such as a semiconductor etc. In addition, the data may pass the external I/F unit 113 to be inputted to a computer etc. directly for image processing.

This application claims priority from Japanese Patent Application Nos. 2004-255693 filed Sep. 2, 2004 and 2005-192013 filed Jun. 30, 2005, which are hereby incorporated by reference herein.

What is claimed is:

1. A solid state image device with a photoelectric conversion unit having a plurality of pixels two-dimensionally arranged and a read out unit for sequentially reading out outputs of the photoelectric conversion unit, the solid state image device comprising:

a frame memory having a plurality of memory elements;
 a recorder for recording a signal of each pixel of the photoelectric conversion unit into the plurality of memory elements of the frame memory; and
 a line memory unit and a horizontal scanning unit for reading out signals recorded in the frame memory, wherein each of the plurality of memory elements is configured with two sample hold circuits each connected in series via switches, with each sample hold circuit including a capacitor and an impedance conversion unit, and with the impedance conversion unit being configured with an operational amplifier, the photoelectric conversion unit and the frame memory are driven by at least a vertical scanning unit, each pixel of the photoelectric conversion unit corresponds one-to-one with each memory element of the frame memory, such that each memory element records an output of a corresponding pixel.

2. A solid state image device according to claim 1, wherein said solid state image device incorporated in a camera that includes:

a lens for forming an optical image of an object into the solid state image device; and a signal processor for processing signals from the solid state image device.

* * * * *